Aug. 28, 1956    A. MIHALKO ET AL    2,760,736
ELECTRIC POWER DRIVEN FISHING REEL
Filed April 11, 1955
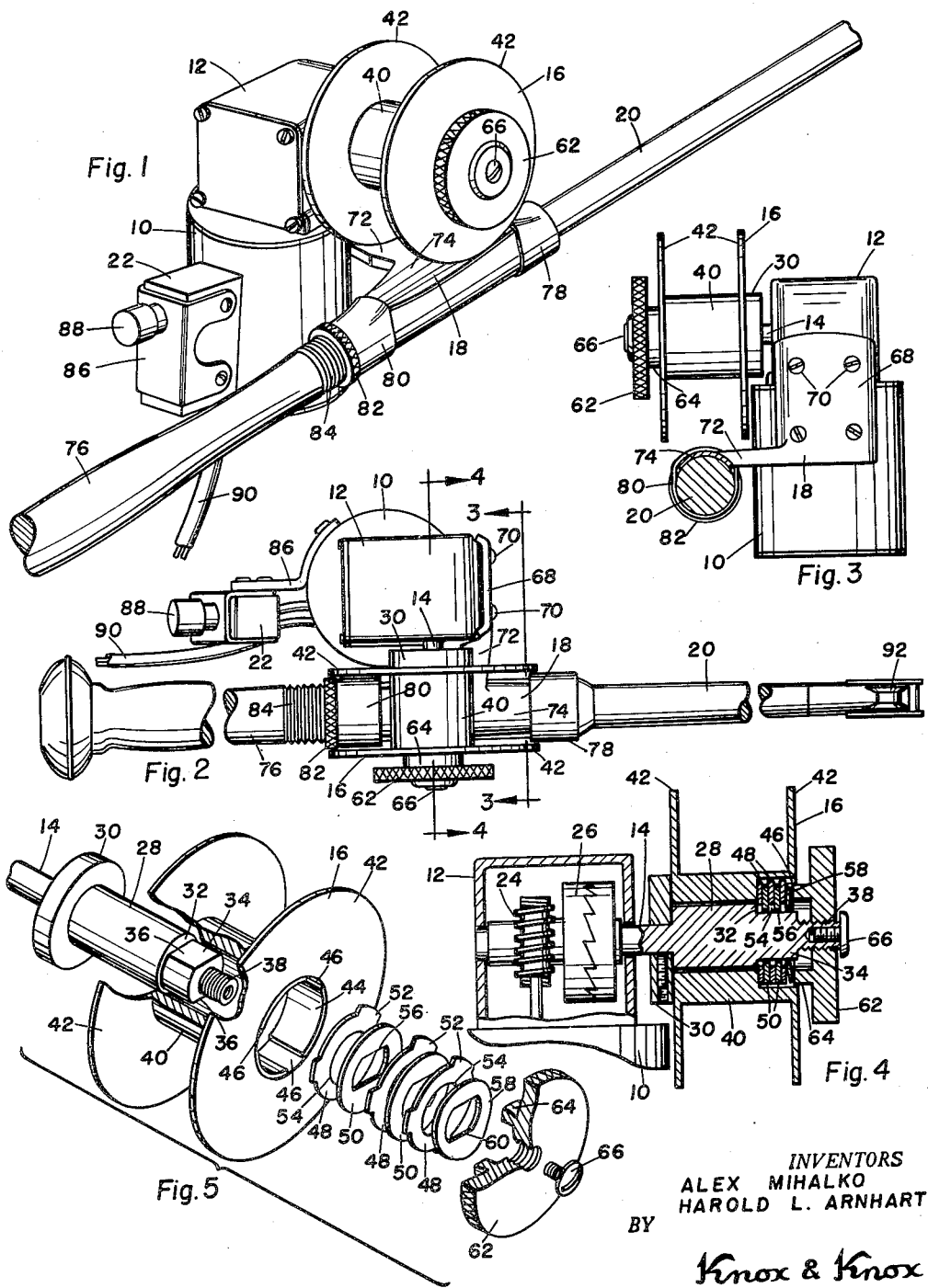
INVENTORS
ALEX MIHALKO
HAROLD L. ARNHART
BY
Knox & Knox

# 2,760,736

ELECTRIC POWER DRIVEN FISHING REEL

Alex Mihalko and Harold L. Arnhart, San Diego, Calif.

Application April 11, 1955, Serial No. 500,352

2 Claims. (Cl. 242—84.5)

The present invention relates generally to fishing tackle and more particularly to an electric power driven fishing reel.

The primary object of this invention is to provide a fishing reel driven by an electric motor mounted directly on a conventional fishing rod, the installation being completely enclosed to prevent injury to the user or jamming of the mechanism.

Another object of this invention is to provide a power driven fishing reel utilizing a constant speed motor in combination with a variable friction clutch to afford complete control of the winding operation.

Another object of this invention is to provide a power driven fishing reel in which the motor is mounted so that its operating switch is convenient to the hand holding the butt of the fishing rod.

Another object of this invention is to provide a power driven fishing reel in which the motor must normally be shut off before the clutch can be adjusted.

Finally, it is an object to provide a power driven fishing reel of the aforementioned character which is generally simple, safe and convenient to operate, and which will give efficient and durable service.

With these and other objects definitely in view, this invention consists in the novel construction, combination and arrangement of elements and portions, as will be hereinafter fully described in the specification, particularly pointed out in the claims and illustrated in the drawing which forms a material part of this disclosure and wherein similar characters of reference indicate similar or identical elements and portions throughout the specification and throughout the views of the drawing, and in which:

Fig. 1 is a perspective view of the fishing reel and its motor mounted on a fishing rod.

Fig. 2 is a top plan view of the device.

Fig. 3 is a sectional view taken on the line 3—3 of Fig. 2.

Fig. 4 is an enlarged sectional view taken on the line 4—4 of Fig. 2.

Fig. 5 is an exploded perspective view, partially cut away, of the spool and clutch mechanism.

Referring now to the drawing in detail, the structure includes a motor 10 having a gear head 12 from which extends a shaft 14 carrying the spool 16. The motor 10 has a bracket 18 designed for attachment to a conventional type of fishing rod 20, and is provided with an actuating switch 22.

The motor 10 is of any suitable type having a high power to weight ratio and will preferably have a voltage rating suitable for use with ship's batteries or power supply. The gear head 12 is conventional and contains any suitable type of right angle drive, such as at 24, and includes a ratchet 26 for positive drive in one direction only, as shown in Fig. 4. The shaft 14 extends from one side of the gear head 12 and has an enlarged portion 28 on which the spool 16 is freely rotatable. Fixed to the shaft 14 is a backing disc 30 which is secured tightly against the shoulder 32 formed by the one end of the enlarged portion 28. At the other end of the enlarged portion 28 is a boss 34 having two opposed flats 36 formed thereon, and extending from the boss is a screwed plug 38.

The spool 16 comprises a drum 40 having radially extending flanges 42 at each end, the overall length of said drum being substantially equal to the total length of the enlarged portion 28 and boss 34. The spool 16 has a counterbore 44 the depth of which is substantially equal to the length of the boss 34, said counterbore having a plurality of shallow grooves 46 in the wall thereof extending axially of the drum 40. Fitted into the counterbore 44 and surrounding the boss 34 are a plurality of lock discs 48 interspaced with a plurality of slip discs 50. The lock discs 48 have radially extending tabs 52 which engage in the grooves 46 and also have circular central apertures 54 so as to be freely rotatable around the boss 34. The slip discs are circular and have flatted central apertures 56 which fit closely over the boss 34 so that said slip discs are fixed relative to the boss and rotatable within the counterbore 44. On the end of the boss 34 is a resilient friction washer 58, arcuate in a transverse plane and having a flatted central aperture 60. Friction is adjusted by a hand wheel 62 threaded onto the screwed plug 38, said hand wheel having a raised pressure ring 64 extending from one face thereof to fit within the counterbore 44. Thus, by screwing the hand wheel 62 inwardly, the lock discs 48 and slip discs 50 are pressed together and the spool 16 is pressed against the backing disc 30, so increasing the driving friction of the assembly. The hand wheel 62 is retained by a retaining screw 66 threaded into the end of the plug 38. This entire structure is shown clearly in Figs. 4 and 5.

The bracket 18 has a support plate 68 which is secured to the motor 10 and gear head 12 by screws 70. Extending from the support plate 68 is an arm 72, at the end of which is an elongated shoe 74 which is arcuate in cross section to fit over the fishing rod 20. The fishing rod 20 is of conventional design having a butt 76 adjacent which is a fixed sleeve 78, said fixed sleeve being shaped to receive one end of the shoe 74. The other end of the shoe 74 is held under an adjustable sleeve 80 which is secured by a lock ring 82 adjustable along a screw threaded portion 84 of the butt 76. The shoe 74 and its retaining sleeves are conventional; thus the fishing reel can be mounted on many existing types of fishing rods.

The bracket 18 is shaped so that the motor 10 is mounted on one side and substantially at right angles to the fishing rod 20. The shaft 14 is normal to the fishing rod 20 and the spool 16 is positioned centrally over the rod. The switch 22, which may be any suitable press switch, is mounted on a bracket 86 secured to the motor 10, said switch being disposed so that the actuating button 88 is in a convenient position to be pressed by the thumb of a hand holding the butt 76. The other hand is thus left free to hold and stabilize the rod at any convenient position. Power is supplied to the motor 10, through the switch 22, by a conductor cable 90 which can be attached to a ship's batteries or power supply.

The device is particularly suitable for deep sea fishing in which a considerable length of line is used. The line is, of course, wound on the spool 16 and the end passes through the usual line guide 92 at the end of the rod 20. To unreel the line the hand wheel 62 is unscrewed to release the pressure on the friction washer 58, so allowing the spool to rotate freely on the enlarged portion 28 of the shaft 14. The hand wheel 62 can then be screwed in to increase friction between the lock discs 48 and slip discs 50, so that the line is prevented from further extension except under load. When a catch is made, the switch 22 is actuated to start the motor and reel in the line. If necessary, the friction can be adjusted and the spool can even be locked whereby the speed of winding can be controlled, the motor being of the type assuring substantially constant speed of rotation of the shaft 14. The most natural and comfortable position to hold the rod is with one hand on the butt 76 adjacent the switch 22, the other hand holding the rod ahead of the motor assembly for stability, or holding the motor itself. The butt 76 is usually supported in a socket which is either attached to a belt or other portion of the fisherman's attire or secured to the fishing vessel. Thus to adjust the hand wheel 62 the hand must be removed from the butt 76, so releasing the switch 22 and stopping the motor 10. This ensures that no injury will result from attempting to grasp the spinning hand wheel 62. The completely enclosed mechanism also adds to safety and makes the device convenient to use, even in cramped quarters.

The mounting means and arrangement, including the bracket incorporates therein several very important features. The bracket 18 enables the power unit to be fitted to many existing types of fishing rods without modification of any kind. The arrangement is such that the motor control button 88 is disposed at the side of the assembly opposite to the hand wheel 62. As already mentioned, this is an important safety feature. For example, the right hand must be used on the grip 76 of the thumb as to be employed to operate the button 88. This makes it impossible for the fisherman to depress the button and at the same time grasp the hand wheel with the same right hand and it is, of course, made quite awkward for him to use his left hand for operating either the button 88 or the hand wheel while maintaining a firm hold on the fishing rod. It has been found that with the spool 16 filled with line the balance of the entire assembly is such that prolonged use of the device is not unduly tiring. The power driven reel has, however, an appreciable weight and being offset to the left side of the assembly tends to keep the assembly tilted slightly in the correct direction to assure that the hand wheel is maintained in an easily accessible position while a fish is being played. In other words, the motor 10 and bracket 18 have a special cooperation and a secondary function as means for biasing the assembly into a position wherein the hand wheel 62 is constantly urged into the preferred position for easy access and safety.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the forms of the invention disclosed herein may be made without departure from the spirit and scope of the invention, and that the specification and drawing are to be considered as merely illustrative rather than limiting.

We claim:

1. A power driven fishing reel assembly for securement to a fishing rod, comprising: an electric motor having a thumb-operated control switch; a shaft driven by said motor; a line carrying spool mounted coaxially on said shaft and at one side of said motor; variable friction clutch means operatively connected with said spool and said shaft for driving said spool; said clutch means including a clutch control hand wheel on the side of said spool remote from said motor; means for rigidly attaching the reel assembly to a fishing rod with said motor at one side of the rod so that the motor comprises weight means to bias the reel assembly toward a tilted position with said hand wheel disposed upwardly in the interest of safety and easy accessiblity to the hand wheel during use; said switch being disposed on the side of said assembly remote from said hand wheel, whereby the operator is virtually prevented from handling the hand wheel and switch simultaneously while holding a fishing rod on which said reel assembly is attached.

2. A power driven fishing reel assembly for securement to a fishing rod, comprising: an electric motor having a thumb-operated control switch; a shaft driven by said motor; a line carrying spool mounted coaxially on said shaft and at one side of said motor; variable friction clutch means operatively connected with said spool and said shaft for driving said spool; said clutch means including a clutch control hand wheel on the side of said spool remote from said motor; means for rigidly attaching the reel assembly to a fishing rod with said motor at one side of the rod so that the motor comprises weight means to bias the reel assembly toward a tilted position with said hand wheel disposed upwardly in the interest of safety and easy accessibility to the hand wheel during use; said clutch means including a plurality of discs mounted in said spool to rotate therewith; a plurality of further discs mounted on said shaft to rotate therewith and in coaxial interspaced frictional relation with the first mentioned discs; said hand wheel being threaded on said shaft and comprising means for varying the frictional contact between the discs; said switch being disposed on the side of said assembly remote from said hand wheel, whereby the operator is virtually prevented from handling the hand wheel and switch simultaneously while holding a fishing rod on which said reel assembly is attached.

References Cited in the file of this patent
UNITED STATES PATENTS

| | | |
|---|---|---|
| 1,580,986 | Aberson | Apr. 13, 1926 |
| 2,190,398 | Bugatti | Feb. 13, 1940 |
| 2,463,108 | Jacobson | Mar. 1, 1949 |
| 2,541,876 | Lockwood | Feb. 13, 1951 |